United States Patent [19]

Igarashi

[11] Patent Number: 5,060,407
[45] Date of Patent: Oct. 29, 1991

[54] APERTURE CARD AND PRINTER THEREFOR

[75] Inventor: Shunkichi Igarashi, Tokyo, Japan

[73] Assignee: Fuji Photo Film Co., Ltd., Kanagawa, Japan

[21] Appl. No.: 544,807

[22] Filed: Jun. 28, 1990

Related U.S. Application Data

[63] Continuation of Ser. No. 143,540, Jan. 13, 1988, abandoned.

[30] Foreign Application Priority Data

Jan. 13, 1987 [JP] Japan .................................. 62-4070
Jan. 13, 1987 [JP] Japan .................................. 62-4071

[51] Int. Cl.$^5$ .............................................. A47G 1/06
[52] U.S. Cl. ......................................... 40/159; 353/25
[58] Field of Search ................ 40/159, 159.2; 400/73, 400/158; 235/60.11; 353/25, 26 R; D14/117; 234/13, 25

[56] References Cited

U.S. PATENT DOCUMENTS 3,700,320 10/1972 Brewer et al. ..................... 353/26 R
3,718,471 2/1973 Edwards et al. ...................... 40/159
3,731,063 5/1973 Bickl et al. ............................ 235/454
3,895,865 7/1975 Kaufman et al. ................. 353/26 R
3,920,987 12/1976 James et al. .......................... 250/282
4,236,332 12/1980 Domo .................................. 40/158.1
4,734,713 3/1988 Sato et al. ............................. 400/73

FOREIGN PATENT DOCUMENTS 98643 4/1988 Japan ..................................... 353/25
2084751 4/1982 United Kingdom ................. 353/25

Primary Examiner—Cary E. O'Connor
Attorney, Agent, or Firm—Sughrue, Mion, Zinn, Macpeak & Seas

[57] ABSTRACT

An aperture card which carries image information in a microfilm mounted on a rectangular paper sheet is widely used as it can conveniently record and control a large volume of image information separately. The aperture card carries a microfilm which records retrieval information corresponding to images of the microfilm at a position peripheral to the images. As such structure of this invention aperture card permits automatic recording of the retrieval information concurrently with the preparation and duplication of the cards, this invention can realize the preparation/duplication system for the aperture cards at a lower cost than before. As the printer suitable for the aperture card can read the retireval information recorded on the microfilm and record them in characters or punches, it can reduce the cost of the system due to the abbreviation of the manufacturing processes and increase the memorandum capacity on paper. The printer may be applicable to automatic punch systems.

4 Claims, 5 Drawing Sheets

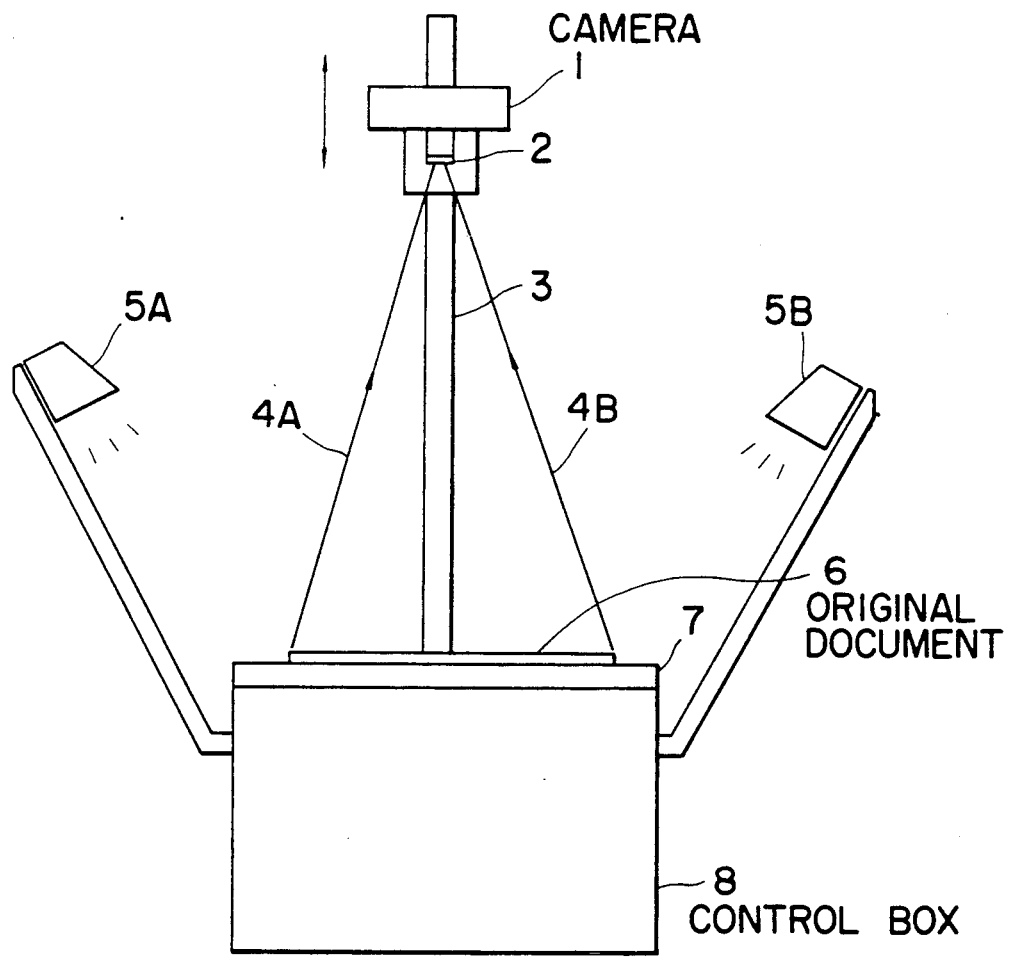
F I G. 7

APERTURE CARD AND PRINTER THEREFOR

This is a continuation of application Ser. No. 143,540, filed Jan. 13, 1988, now abandoned.

BACKGROUND OF THE INVENTION

This invention relates to an aperture card provided with a microfilm on a window thereof and to a printer for aperture cards which records retrieval information on the microfilm.

An aperture card comprises a microfilm which records image information such as drawings and which is mounted on a rectangular paper sheet. The aperture card has been widely used as it is extremely convenient and handy for recording and managing a large volume of image information separately.

FIG. 1 shows the appearance of a typical aperture card 30 of the prior art having a punch memory section 31 at the left portion thereof which is printed or punched to record necessary information. The aperture card 30 is further provided with a rectangular window 32 at a position in the right thereof which is mounted with a microfilm 33 which has been photographed or duplicated separately via a tape 34. The microfilm 33 stores images 35 in characters, graphics or the like. The conventional aperture cards 30 of this type, however, are detrimental in that the content of images such as engineering drawings, specifications, or parts lists recorded on the microfilm 33 are too small to be read macroscopically, and need an optical reader therefore for magnification. The information retrieved from images such as drawing serial numbers or drawing classification numbers punched or printed on the punch/memorandum section 31 was heretofore separately read by a punch reader or macroscopically for confirmation.

FIG. 2 shows an embodiment of the prior art manufacturing system of aperture cards wherein the information retrieved from images 40 such as engineering drawings is listed in a list 41 classified under the retrieval codes, and an operator inputs data by referring to the list 41 for converting the retrieval information to the punching code to thereby punches a sheet of paper with the codes to prepare a punched card 42. The operator then sets a fresh aperture card 44 in a punch card duplicator 43 to punch the aperture card 44 with the information which has been recorded in perforation on the punched card 42. The operator mounts thus prepared aperture card 45 on a printer 46 to print necessary information on the card at the punch/memorandum section 31 to finally prepare an aperture card 47. In a procedure parallel to the retrieval information, the images 40 are photographically recorded by a means for photographing microfilm on a roll of film 48. The roll of the film 48 is mounted by a mounter 49 on an aperture card 47 which has already been provided with the retrieval codes to complete the aperture card 30 of FIG. 1.

In the conventional manufacturing system for the aperture cards, some mismatching occurs when mounting images correctly on a corresponding card which has been punched or printed even if the operator prepares the retrieval code list by referring to the drawings or images frames. This defect is attributable to the fact that images 35 and retrieval codes of the microfilm 33 are recorded once on separate media and matched. Unless an expert who is familiar with the contents of the images 35 is assigned to the punch or printing process, the mismatching may occur very easily. Moreover, an aperture card sometimes should be duplicated when cards with identical information are to be distributed among plural parties. In the prior art procedure, it is necessary to mechanically punch or print the data on a fresh card for duplication and then photographically copy the film images of the original card. The step for punch or printing is separate from that of photographic duplication to thereby complicate the procedure and run a risk of mismatching between the retrieval information and the images.

There is a mounting demand for a manufacturing system which can correspond the images and the retrieval information of the microfilm which are to be mounted on an aperture card fully in one to one relation and which can correctly print or punch the above retrieval information at the punch/ memorandum section of the aperture card.

SUMMARY OF THE INVENTION

The present invention was contrived in order to solve the problems encountered in the prior art and aims at providing an aperture card which is mounted with a microfilm which has been photographed with retrieval information corresponding to the particular image thereof on the periphery of the images of the microfilm.

Another object of this invention is to provide a printer for aperture cards which can record information in characters corresponding to the retrieval information on the punch/memorandum section of the aperture card.

According to one aspect of this invention, for achieving the objects described above, there is provided an aperture card mounted with a microfilm on a window thereof which is characterized in that retrieval information is recorded on the periphery of images on the microfilm.

According to another aspect of the present invention, there is provided an aperture card printer comprising a conveyor mechanism which conveys aperture cards one by one from a tray to an output section, a reading means which reads retrieval information recorded on the periphery on the images of a microfilm mounted at the window of the aperture card, and a recording means which punches or prints the retrieval information read by the reading means at a punch/memorandum section of the aperture card, which is characterized in that while the aperture card is being conveyed from the tray to the output section, the retrieval information is recorded on the punch/ memorandum section thereon.

The nature, principle and utility of the invention will become more apparent from the following detailed description when read in conjunction with the accompanying drawings.

BRIEF DESCRIPTION OF THE DRAWINGS

In the accompanying drawings:

FIG. 7 is a view to show an embodiment of a microfilm photographing device to be used for this invention;

DESCRIPTION OF THE PREFERRED EMBODIMENTS

Figure 3:
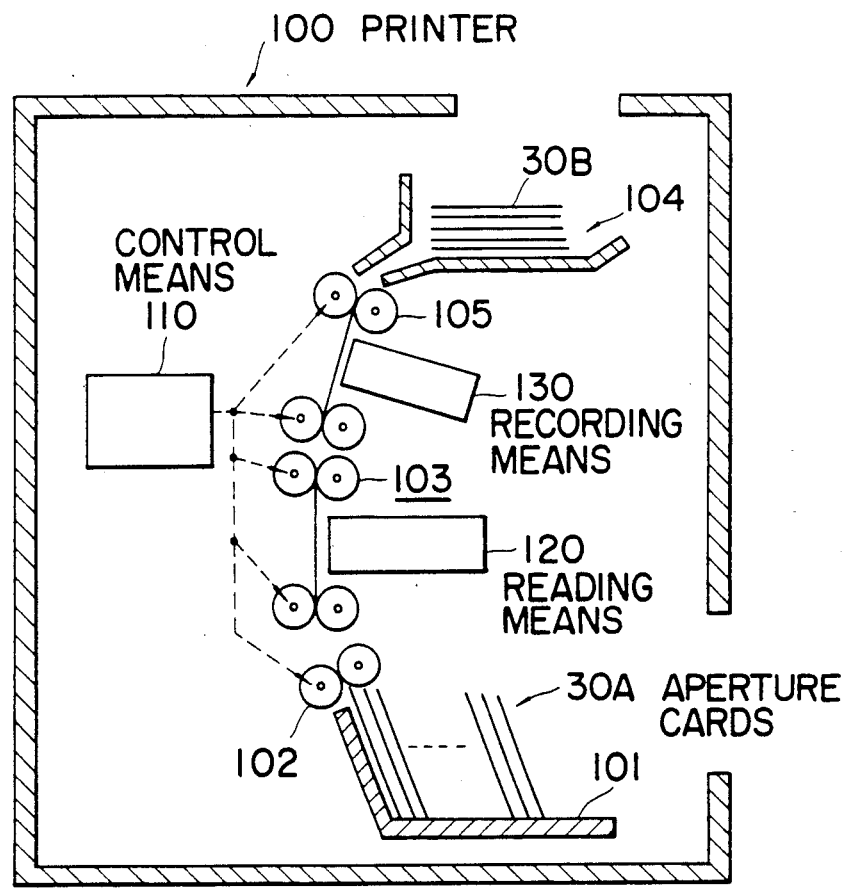
FIG. 3 is a schematic view to show an embodiment of this invention structure.

FIG. 3 schematically shows the structure of a printer 100 for aperture cards according to this invention wherein this invention aperture cards 30A (which will be described hereinafter) are arranged in a row at a tray 101, taken out by pay out rollers 102 one by one, and conveyed successively along a conveyor path. The conveyor path comprises plural conveyor rollers 103 and feed out rollers 105 at an end of the path which consecutively piles the aperture cards at a card output section 104. The pay out rollers 102, the conveyor rollers 103 and the feed out rollers 105 are controlled and driven by a control means 110, respectively. A reading means 120 is operatively provided at an intermediate position of the conveyor path which either optically or magnetically reads retrieval information recorded on the microfilm on each aperture card 30A. Further, a recording means 130 is also provided at an intermediate position of the conveyor path which prints in characters the read data or punches them at the punch/memorandum section of the aperture card 30A. The aperture cards 30B which have been recorded with the retrieval information at the punch/memorandum section thereof are conveyed to and piled at the card output section 104.

Figure 1:
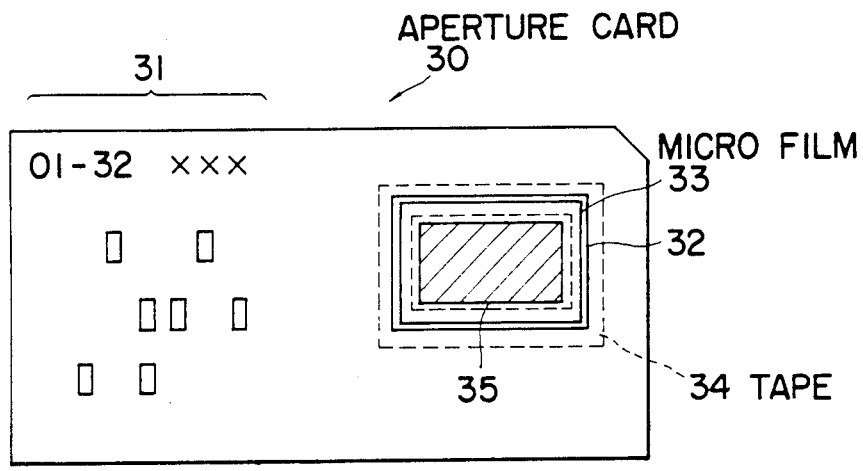
FIG. 1 is a view to show an embodiment of the prior art aperture card.
Figure 2:
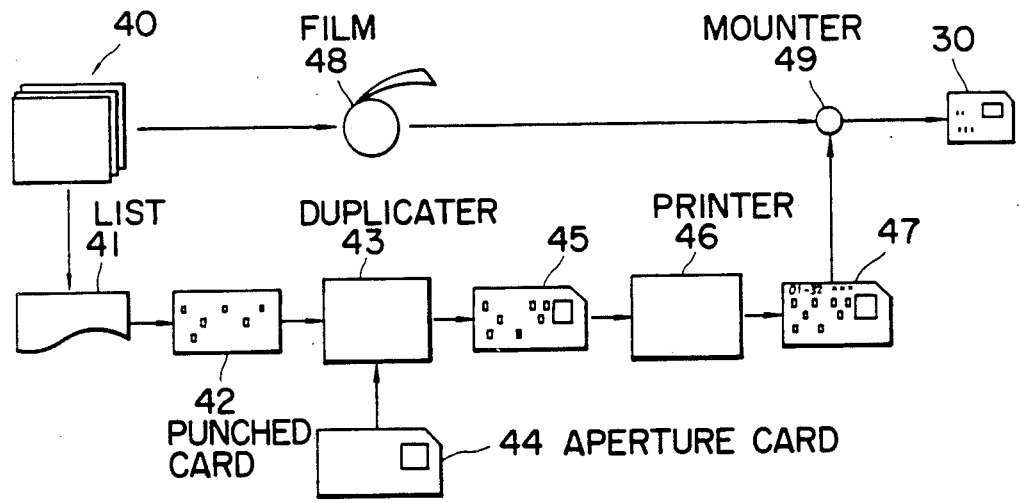
FIG. 2 is a view to describe the manufacturing system of the prior art aperture card.
Figure 4:
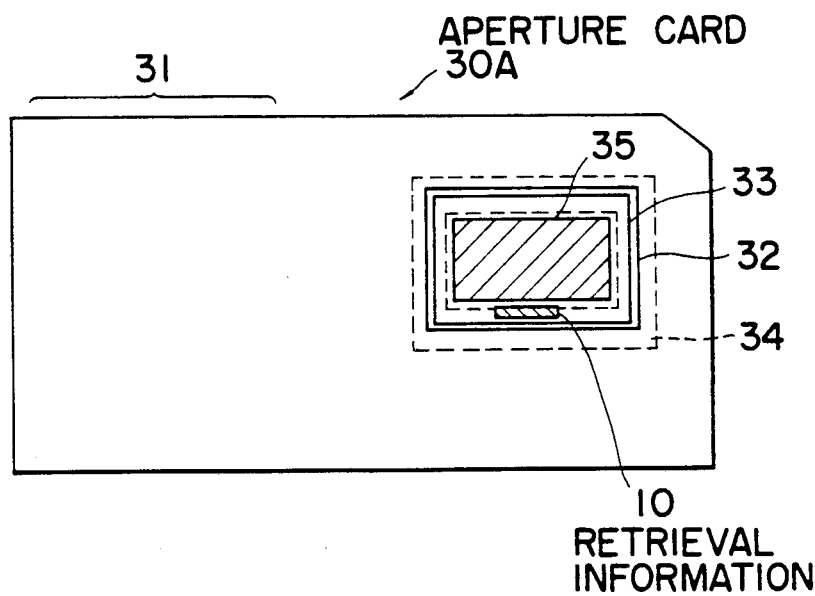
FIG. 4 shows an embodiment of the aperture cards of this invention.
Figure 5:
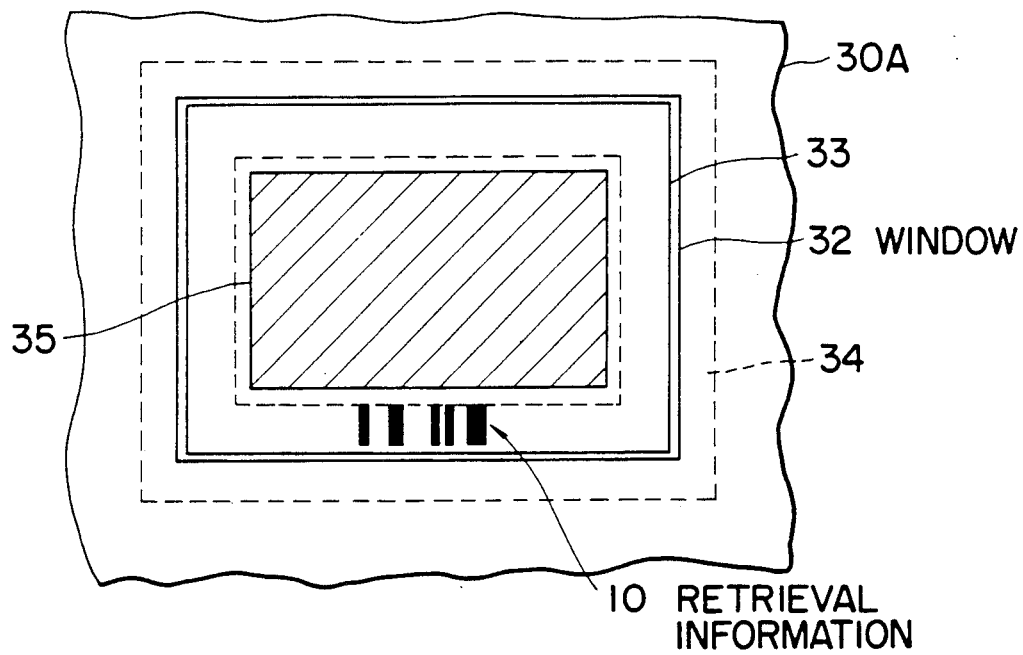
FIG. 5 is a view to show a window thereof in detail.

FIG. 4 shows this invention aperture card 30A in correspondence to FIG. 1, which is recorded with retrieval information 10 on the periphery of the images of the microfilm 33. Although this embodiment shows the retrieval information 10 recorded below the images, the information may be recorded at left and/or right sides thereof. FIG. 5 shows a window 32 thereof in detail wherein the retrieval information (bar codes) 10 is recorded on the periphery (in the figure the bottom thereof) of the images 35 to correspond to the images 35. Since the images 35 and the retrieval information 10 corresponding thereto are recorded on a same microfilm 33 in this invention aperture card, both pieces of information can be utilized intergrally without controlling the retrieval information in separate media. Even when the aperture card 30A is mounted on a reader to read the images 35, the retrieval information recorded on the bottom of the card can be read (i.e. mechanically read) together with the images 35. An ordinary aperture card duplicator without a punching function can duplicate the images and the retrieval codes simultaneously.

Figure 6:
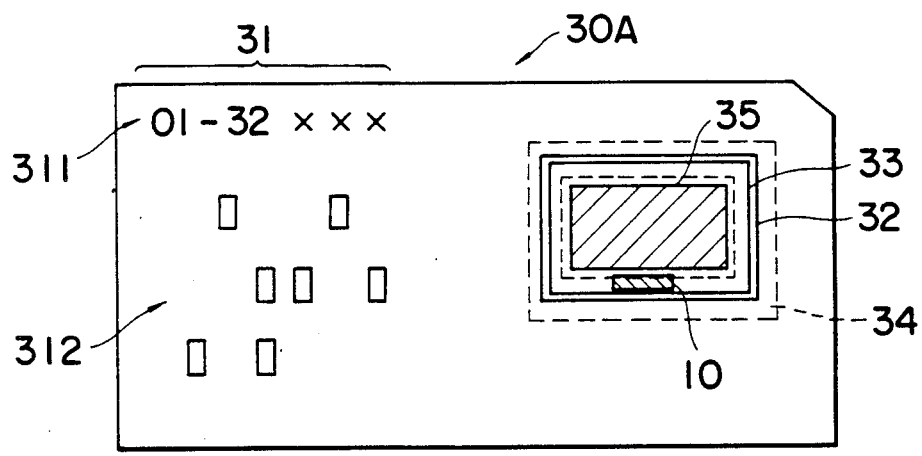
FIG. 6 is a view to show an aperture card which has been recorded with retrieval information at the punch-/memorandum section according to this invention.

According to this invention as shown in FIG. 4, the aperture card 30A is placed in the tray 101 of the printer 100, the control means 110 actuated by pushing a switch (not shown) to start printing, and the aperture cards 30A are paid out to the conveyor path one by one by the pay out rollers 102. The aperture cards 30A which have been paid out onto the conveyor path are sent to a reading section by the conveyor rollers 103, and suspended there. The aperture cards are optically read, for instance, with the reading means 120 to obtain the retrieval information 10 which has been recorded on the microfilm 33 the reading occuring either during conveyance or suspension. The device feeds the read out retrieval information such as bar codes to the recording means 130 which converts the same to character information which can be read macroscopically or to punch data. It also conveys the aperture card 30A to a recording section to print the character information 311 or open holes 312 at the punch/memorandum section 31 thereon as shown in FIG. 6. The characters and perforation data corresponding to the retrieval information 10 recorded on the microfilm 33 are thus recorded at the punch/memorandum section 31 of the aperture card 30A in the form of the character information 311 or the open holes 312. This fact allows users to read the printed characters at a faster speed as they are printed in large size free without troubles such as reading of the minute retrieval information 10 with the user's eyes. The aperture card 30B which has been recorded with the retrieval information is further conveyed to the card output section 104 with the conveyor rollers 103 and the feed out rollers 105.

Figure 8:
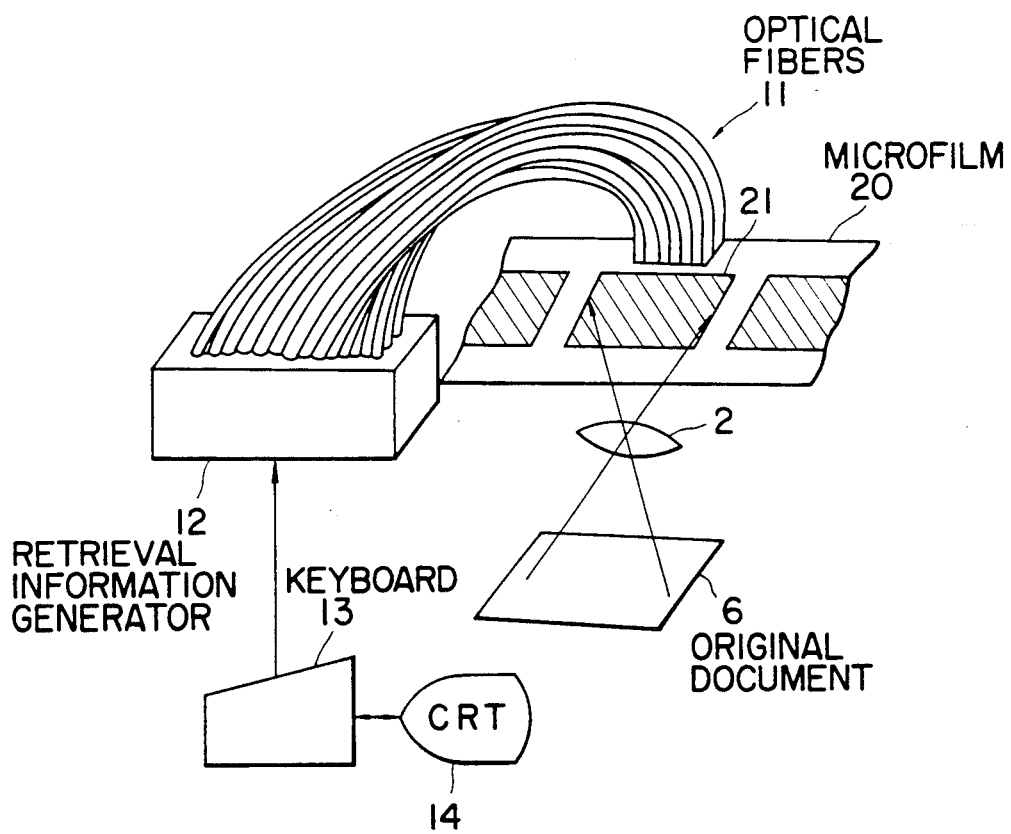
FIG. 8 is a view to show the mechanism for photographing retrieval information.

Referring to FIGS. 7 and 8, the method for recording the retrieval information 10 at the periphery of the images 35 of the microfilm 33 will now be described.

Figure 9:
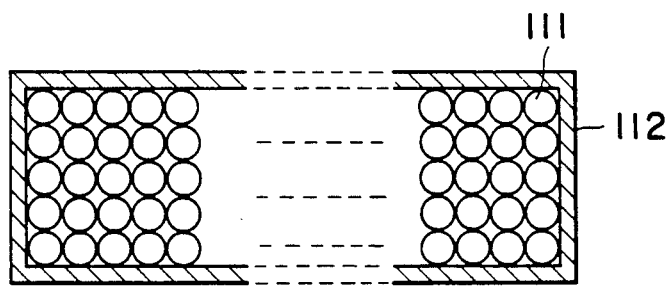
FIG. 9 is a view to show the structure of ends of optical fiber which are used for this invention.

FIG. 7 shows a typical device for photographically recording images on a microfilm. A camera 1 having a focusing lens 2 is vertically moved up and down aling a support pole 3 so as to include an original document 6 placed on a copying table 7 in its converages 4A, 4B as well as focusing it at an optimal magnitude for photographing. The original document 6 is photographed on a microfilm frame by frame. The illumination lamps 5A and 5B supported on a control box (main body) 8 and arranged at both sides thereof are directed to the original document 6 so that it is illuminated with an optimal amount of light. FIG. 8 shows a photographing mechanism for the retrieval information wherein optical fibers 11 are bundled on the periphery of images within the frame of a microfilm 20 so as to record optically the retrieval information via the optical fibers 11. The section at an end of the optical fiber bundle 11 facing the microfilm 20 comprises a plural number of optical fibers 111 arranged in a form to a rectangle as shown in FIG. 9 framed with a rectangular frame 112. Therefore, within the rectangular frame 112 of the optical fibers 11, optical information is exposed with light on the microfilm 20 so as to record the data thereon. This invention device is not limited to the aforementioned microfilm 20 of the type of roll, but is applicable to an ordinary aperture card camera processor which use film cards mounted in advance with unexposed film.

The other ends of the optical fibers 11 are operatively connected to the retrieval information generator 12 which converts the information which has already been inputted into retrieval information while referring visually to the images displayed at a display screen 14 with a keyboard 13. The information thus converted is further converted by the retrieval information generator 12 from electric information to optical information so as to be outputted by the optical fibers 11. In parallel to the process or concurrent thereto of the photographing step of the images 21 of a frame of the microfilm 20, the retrieval information of the original document 6 is at the same time inputted from the keyboard 13. This causes the retrieval inforamtion generated at the generator 12 to be converted into optical data, exposed to the light and recorded on the periphery of the images 21 in the frame via the optical fibers 11.

The microfilm 20 which has been photographed with the images and the retrieval information corresponding to the images is cut into a predetermined frame size. A frame of the microfilm is mounted with a mounter at the window portion of an aperture card to complete the aperture card with the retrieval information 10 recorded on the periphery of the images of the frame 35 as shown in FIG. 4.

Although the information is optically transmitted from the retrieval information generator 12 to the microfilm 20 via the optical fibers 11 in the above embodiment, it is possible to directly record it on the microfilm 20 by providing an array of a large number of light emitting diodes on the predetermined position on the microfilm 20. The recording may be conducted by a device which can output the contents of a CAD (Computer Aided Design) image to an aperture card. In such a case a means (such as laser beams) for writing in the images may be provided to write in the retrieval information. The retrieval information may be in the form of characters, bar codes, dots, etc. If optical recording is not used, the recording may be in the form of MICR, OCR, etc., which requires a reading means suitable for the particular mode. The position for recording the retrieval information is not limited to the bottom of the microfilm beneath the images, but may be at any arbitrary peripheral position.

As described in detail in the foregoing statement, this invention aperture card can realize a system which prepares and duplicates such cards at lower cost than before because the card is capable of being automatically recorded with retrieval information concurrently at the times of preparation and duplication of cards. The manufacturing processes for the aperture cards can prevent the occurrence of mismatching between the retrieval information and images. Further, this invention printer for the aperture cards can read retrieval information recorded on the microfilm and convert them in characters or punch to increase the memorandum capacity on paper and reduce the cost due to the abbreviation of the manufacturing processes. The printer may be applied to an automatic punch system. As it can print retrieval information on the same frame corresponding to the images, no error will be made in controlling of the retrieval information or use of images.

It should be understood that many modifications and adaptations of the invention will become apparent to those skilled in the art and it is intended to encompass such obvious modifications and changes in the scope of the claims appended hereto.

What is claimed is:

1. An aperture card mounted with a microfilm on a window thereof which is characterized in that retrieval information containing at least a portion of the contents of frames of said microfilm is recorded on a non-imaged portion on the periphery of images on said microfilm, and said recorded retrieval information is printed at a punch/memorandum section of said aperture card.

2. The aperture card as claimed in claim 1 wherein said retrieval information is in the form of bar codes.

3. The aperture card as claimed in claim 1 wherein said printed information corresponding to said retrieval information is printed in characters at said punch/memorandum section of said aperture card.

4. An aperture card mounted with a microfilm on a window thereof which is characterized in that retrieval information containing at least a portion of the contents of frames of said microfilm is recorded on a non-imaged portion on the periphery of images on said microfilm and said recorded retrieval information is punched at a punch/memorandum section of said aperture card.

* * * * *